No. 812,147. PATENTED FEB. 6, 1906.
J. A. McCONNELL.
APPARATUS FOR MOLDING MATERIALS WHICH SET BY THE ADDITION
OF WATER THERETO.
APPLICATION FILED FEB. 23, 1904.
2 SHEETS—SHEET 2.
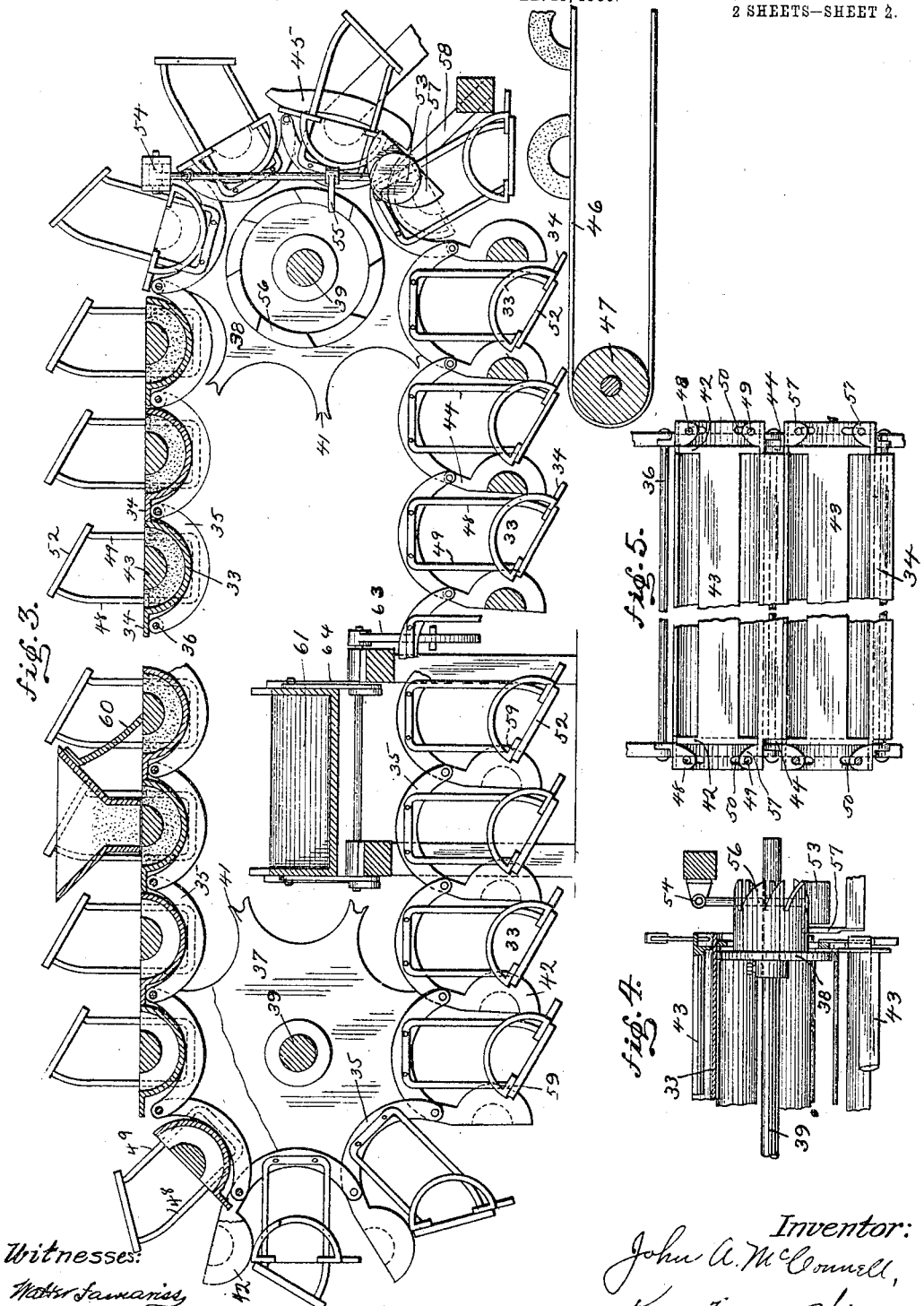
Witnesses:
Inventor:
John A. McConnell,
By Kay, Totten Winter
Attorneys.

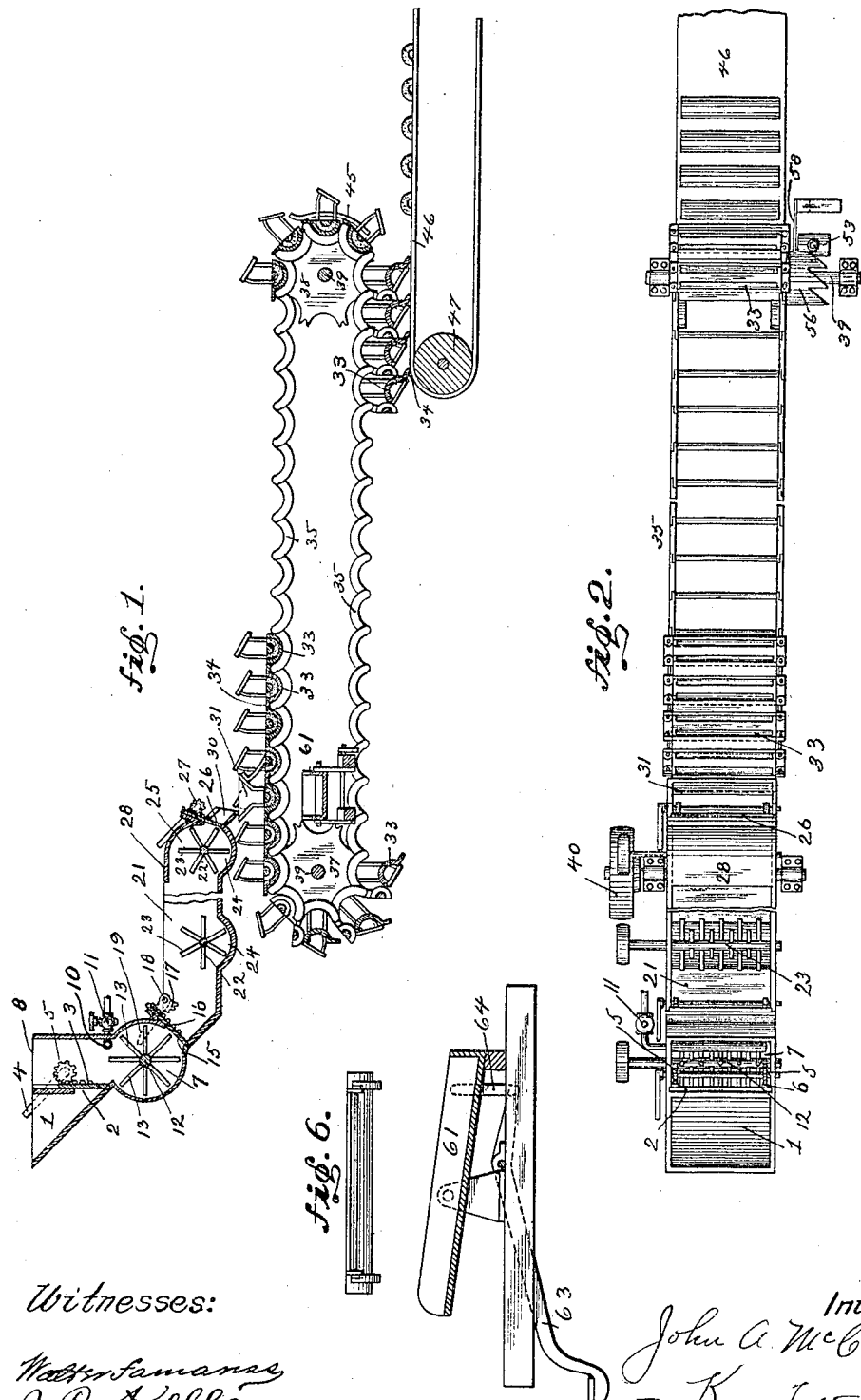

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

APPARATUS FOR MOLDING MATERIALS WHICH SET BY THE ADDITION OF WATER THERETO.

No. 812,147. Specification of Letters Patent. Patented Feb. 6, 1906.

Original application filed April 27, 1901, Serial No. 57,809. Divided and this application filed February 23, 1904. Serial No. 194,809.

*To all whom it may concern:*

Be it known that I, JOHN A. McCONNELL, a resident of Allegheny, in the county of Allegheny and State of Pennsylvania, have invented a new and useful Improvement in Apparatus for Mixing Molding Materials Which Set by the Addition of Water; and I do hereby declare the following to be a full, clear, and exact description thereof.

My invention relates to apparatus for molding materials which set by the addition of water thereto—such as cement, plaster-of-paris, magnesia, water-lime, &c., and mixtures of such materials with lime, sand, gravel, furnace-slag, or broken volcanic scoria, or mixtures of such setting materials with fibrous materials, such as hemp, hair, asbestos, fiber, &c.

The object of my invention is to provide apparatus for molding such materials in a substantially continuous stream.

In my application, filed April 27, 1901, Serial No. 57,809, I described and claimed apparatus arranged to mix the materials above named in a substantially continuous stream and for molding the said materials in the same continuous manner. The present application is a division of the application aforesaid, and has for its object to claim one of the specific forms of molding apparatus illustrated and described in the said application.

In the accompanying drawings, Figure 1 is a vertical section through the molding apparatus and so much of the wetting and mixing apparatus as is necessary to show its relation to the molding apparatus. Fig. 2 is a plan view of the same. Fig. 3 is a vertical sectional view through the molds, on an enlarged scale, showing the manner of discharging the contents of the molds. Fig. 4 is a vertical transverse section through the same. Fig. 5 is a plan view of connected molds, and Fig. 6 is a section through the overflow-trough.

The materials will first preferably be mixed in a dry state, as described in my application aforesaid, and will then be deposited either in the measuring-hopper 1, which is provided in one wall with a longitudinal opening 2, extending the full width of said hopper and closed by the sliding gate 3, which gate is adapted to be raised by means of a crank 4 or the like connected to a toothed wheel 5, which engages a rack or racks 6 on the gate, and which gate when raised will permit the material to pass down into the mixing-chamber 7, or said material may enter directly into the chamber 7 through the opening 8.

The material will enter the mixing-chamber 8 in a broad thin stream, and parallel to the openings into this mixing-chamber is a perforate water-pipe 10, provided with a valve 11, which pipe supplies the necessary water to the dry material as it enters the chamber in a broad thin stream, thus thoroughly wetting all portions thereof. This mixing-chamber preferably is cylindrical, and in it is rotatably mounted a shaft 12, provided with a series of spikes or pins 13, which serve to agitate and thoroughly mix the material in said chamber. The chamber at one side is provided near the bottom thereof with a longitudinal discharge-opening, which is closed by the gate 15, having connected thereto a rack 16, which is engaged by a gear 17 on a shaft 18, adapted to be operated by a crank or handle 19, whereby said gate may be opened and closed.

The cylindrical chamber 7 is preferably made of metal and is solidly connected with the reservoir or tank 21. If desired, however, the chamber 7 may be separate from the tank 21 and so placed as to empty into the same. The reservoir or tank 21 may be of any desired length and is provided at intervals with agitating and mixing devices 22, two such devices being shown, but either more or less may be used, as necessary or desirable. Each of these agitating devices comprises a rotatable shaft, to which are fixed blades 23, and the devices fit into concave depressions 24 in the bottom of the reservoir, so that by the rotation of the shafts and blades the material is not only agitated and mixed, but is fed forward in a continuous broad stream.

The discharge end of the reservoir is provided with a portion 25, in which is located the last of the agitating devices 22. This end is provided with a discharge-opening of the full width of the tank and closed by a gate 26, which is opened and closed by a rack-and-pinion device 27, such as described in connection with the gate 15. This end of the reservoir is covered, as shown at 28, so that when the gate 26 is closed the material will be carried around by the agitating device 22 and returned to the body of the reservoir and will not be thrown out of the same, as would otherwise be the case. From the discharge-opening of the reservoir a chute or spout 30 directs the material to the molds either directly or through the intervening trough 31, which may be placed directly over the molds and serves to fill the same.

The wetting and mixing apparatus so far described is claimed in my application aforesaid, of which the present is a division, and further description thereof is not necessary herein. Suffice it to say that it serves to thoroughly mix the material and to feed the same forward in a continuous broad stream, and the discharge-opening from the reservoir 21 delivers the material to the molds in a broad flat stream. In conjunction with this mixer I employ molding apparatus comprising an endless series of horizontally-disposed molds shaped to form the desired articles, such as semitubular pipe-coverings and the like. These molds each comprise either a semicylindrical or angular metal trough 33, provided on one side with a horizontal web or plate 34, which contacts with the side of the next adjacent mold. These molds normally rest in curved or other shaped links 35, which are pivotally connected by bolts or rods 36 to form a continuous chain carrying a series of molds. This chain passes over the sprocket-wheels 37 and 38 on the shafts 39, which are rotated either continuously or intermittently by suitable mechanism, such as the belt-pulley 40. The sprocket-wheels 37 and 38 are provided with notched projections 41, which engage the rods or bolts 36, and thereby communicate motion to the said chains and to the series of molds carried thereby.

The ends of the molds 33 are open, as shown, but are adapted to be closed by end pieces 42, secured to the cores 43. The end pieces are provided with the arms 44, the outer ends of which are pivoted to the sides of the molds, preferably on the bolts or rods 36, as shown, so that the cores 43 and end pieces 42 may be swung either down into the molds or out of the same. At the discharge end of the endless series of molds I secure to the frame curved guides 45, which prevent the core-pieces and molds from becoming displaced and the molded articles from dropping out of the molds until the latter are in substantially an inverted position.

Underneath the discharge end of the molds is located the endless table or belt 46, which passes over pulleys 47 and is caused to travel continuously or intermittently by suitable mechanism. (Not shown.) The molds when in upright position are filled with the plastic material from the chute 30 or trough 31 and are then carried in horizontal position either continuously or in intermittent steps to the discharging end of the chain, the distance through which the molds travel being such that the plastic material will have an opportunity to firmly set before reaching the discharge end. As the molds pass around the sprocket-wheel 38 they are prevented from opening by the guides 45; but as soon as said molds are in inverted position they have passed beyond this guide, so that the pivoted cores 43 and end pieces 42 will swing out of the molds by gravity and assume a vertical position, thereby permitting the molded articles to drop out of the molds upon the traveling belt or table 46.

To prevent breakage of the molded articles by falling on the table or apron 46, I so mount the molds that as they discharge the articles they move closer to the traveling table or apron 46, and thus shorten the fall of the molded articles after leaving the molds. To accomplish this, I attach to the links 35 at each end of each mold two rods 48 and 49, which stand at an oblique angle to the receiving table or apron 46, as shown. These rods pass through slots 50 in the bottoms of the molds 33 and through openings in lugs or ears 57 on the sides of the molds at each end thereof. When the molds reach the under side of the sprocket-wheel 38 and pass beyond the end of the curved guide 45, they will slide down the rods 48 and 49, and as these are on an incline, as shown, they partially support the weight of the mold, and thus break the force of the fall; but at the same time they bring the mold down close to the traveling table or apron 46, so that the molded article falls but a short distance, whereby liability of breakage is greatly reduced.

The ends of the rods 48 and 49 are connected by a bar 52, which is on an incline, as shown, and against which the mold is adapted to strike, thereby imparting a slight jar or shock to the same in order to discharge the molded article therefrom. The molds are preferably made of sheet metal so that they will spring somewhat, and the outer ends of the rods 48 and 49 are slightly wider apart than their inner ends. Consequently the molds are slightly spread or opened as they slide down the inclined rods, thereby releasing their grip on the molded articles.

To further aid in loosening the molded articles in the molds, I provide a tapping device, such as the mallet or hammer 53, which is pivotally suspended at 54 from a stationary part of the machine-frame and is provided with a pin 55, which is engaged by the cams 56, secured to the shaft 39. As the latter rotates the cams 56 push the hammer or mallet out of its vertical position, and as the pin 55 passes the points of the cams 56 the hammer or mallet will fall by gravity and tap the ends of the molds, the cams 56 being so located that the mallet or hammer 53 will be permitted to fall when the molds are just in the right position to discharge the article therefrom. To prevent battering and marring the ends of the molds, a flat metal plate 57 is preferably interposed between the ends of the molds and the hammer or mallet 53, this plate receiving the blow of the hammer or mallet and imparting the shock to the end of the mold. The plate is secured on the end of a flat plate-spring 58, which returns it to its position after each stroke of the mallet. By the apparatus described the molded article is loosened in the mold and its discharge therefrom is insured, and it is delivered to the belt or table 46 in such a manner as to prevent breakage thereof.

After the article has been discharged from the molds the latter, with their cores 43, hang in substantially a vertical position, as shown, the molds being provided with slots on one side thereof, as at 59, in which the end pieces 42 of the cores project. The molds in this open condition then pass back to the receiving end of the machine, and as they pass around the sprocket-wheel 37 and come gradually to their upright position the molds 33 slide back down to the fixed end of the inclined rods 48 and 49, and the pivoted cores 43 and end pieces 42 then fall down into position in the molds to receive the next charge of plastic material, and in this condition the molds pass underneath the trough 31 to again receive plastic material from the same.

Adjacent to or suitably secured to the trough 31 is a sleeking-apron 60, which serves to sleek off the top of the material in the molds and strike off any excess of material which will pass into the next mold or fall down into the overflow-trough 61, located within the chain of molds beneath the trough 31. This overflow-trough 61 has one end open and is pivoted near its middle on horizontal pivots, so as to rest normally in an inclined position. A lever 63 is connected to the trough by a link 64, so that the trough can be readily tipped to discharge the contents therefrom at its open end, which contents may be returned to the trough 31 or reservoir 21 or molded by hand, as desired.

The molding apparatus described operates practically automatically to mold and discharge the articles. The movement of the molds may be either continuous or intermittent. The semiliquid material will flow into the molds whenever the gate 26 is open, and said molds will remain in a horizontal position sufficiently long to permit the thorough setting of the material, after which the molded sections will be automatically discharged. Articles of other shape than the half-tubes shown may be molded in the same manner by merely changing the form of the molds.

What I claim is—

1. In apparatus for wetting, mixing and molding materials which set by the addition of water thereto, the combination with mechanism for wetting and mixing the material, of a series of traveling molds for receiving the wet material from the mixer, and a tilting overflow-trough located beneath the molds at the discharge end of the mixer for receiving the overflow from the molds.

2. In apparatus for wetting, mixing and molding materials which set by the addition of water thereto, the combination with mechanism for wetting and mixing the material, of a chute for conveying the wet material from the mixer, a series of molds adapted to pass underneath the chute and receive the material therefrom, a sleeking device adjacent the chute, and an overflow trough or reservoir underneath the molds below the chute for receiving and storing the overflow from the molds.

3. In apparatus for molding materials which set by the addition of water thereto, the combination of a traveling series of trough-shaped molds, and cores for said molds arranged longitudinally of said molds and lying centrally therein and which automatically swing out of and into said molds under the influence of gravity.

4. In apparatus for molding materials which set by the addition of water thereto, the combination of traveling chains, trough-shaped molds carried thereby, and removable cores for the molds pivoted with relation thereto and arranged to lie centrally within the outer faces of the molds.

5. In apparatus for molding materials which set by the addition of water thereto, the combination of traveling chains, trough-shaped molds carried thereby, longitudinal core-pieces for said molds, and arms on said core-pieces pivoted with relation to and arranged to lie centrally within the outer faces of the molds.

6. In apparatus for molding materials which set by the addition of water thereto, the combination of molds having open ends, removable cores therefor, and plates attached to said cores the edges of which fit the inner surface of the molds, thereby forming removable ends for the molds.

7. In apparatus for molding materials which set by the addition of water thereto, the combination of traveling chains, open-ended molds carried thereby, removable cores for said molds, end pieces attached to said cores, and means for pivotally securing the cores with relation to the molds.

8. In apparatus for molding materials which set by the addition of water thereto, the combination of traveling chains, molds carried thereby, a receiving table or belt, inclined rods attached to the traveling chains, and connections between said rods and the molds whereby the latter automatically slide down the inclined rods in close proximity to the receiving table or belt and automatically slide back into position on the chains.

9. In apparatus for molding materials which set by the addition of water thereto, the combination of traveling chains, open-ended molds carried thereby, a receiving table or belt, and inclined rods attached to the chains and having the molds slidably connected thereto, said rods being wider apart at their outer ends whereby the molds will automatically slide down the inclined rods in close proximity to the receiving-belt and be slightly spread thereby.

10. In apparatus for molding materials which set by the addition of water thereto, the combination of traveling chains, molds carried thereby, a receiving table or belt, inclined rods attached to the chains, a stop or projection on the free end of said rods, and connections between the molds and said rods whereby the former can automatically slide down said rods into close proximity to the receiving-belt and contact with said stop or projection.

In testimony whereof I, the said JOHN A. McCONNELL, have hereunto set my hand.

JOHN A. McCONNELL.

Witnesses:
ROBERT C. TOTTEN,
G. KREMER.